Nov. 18, 1958  J. W. McELGIN ET AL  2,860,833
MULTI-ROOM HEATING AND VENTILATING SYSTEM
Filed April 21, 1955  3 Sheets-Sheet 3
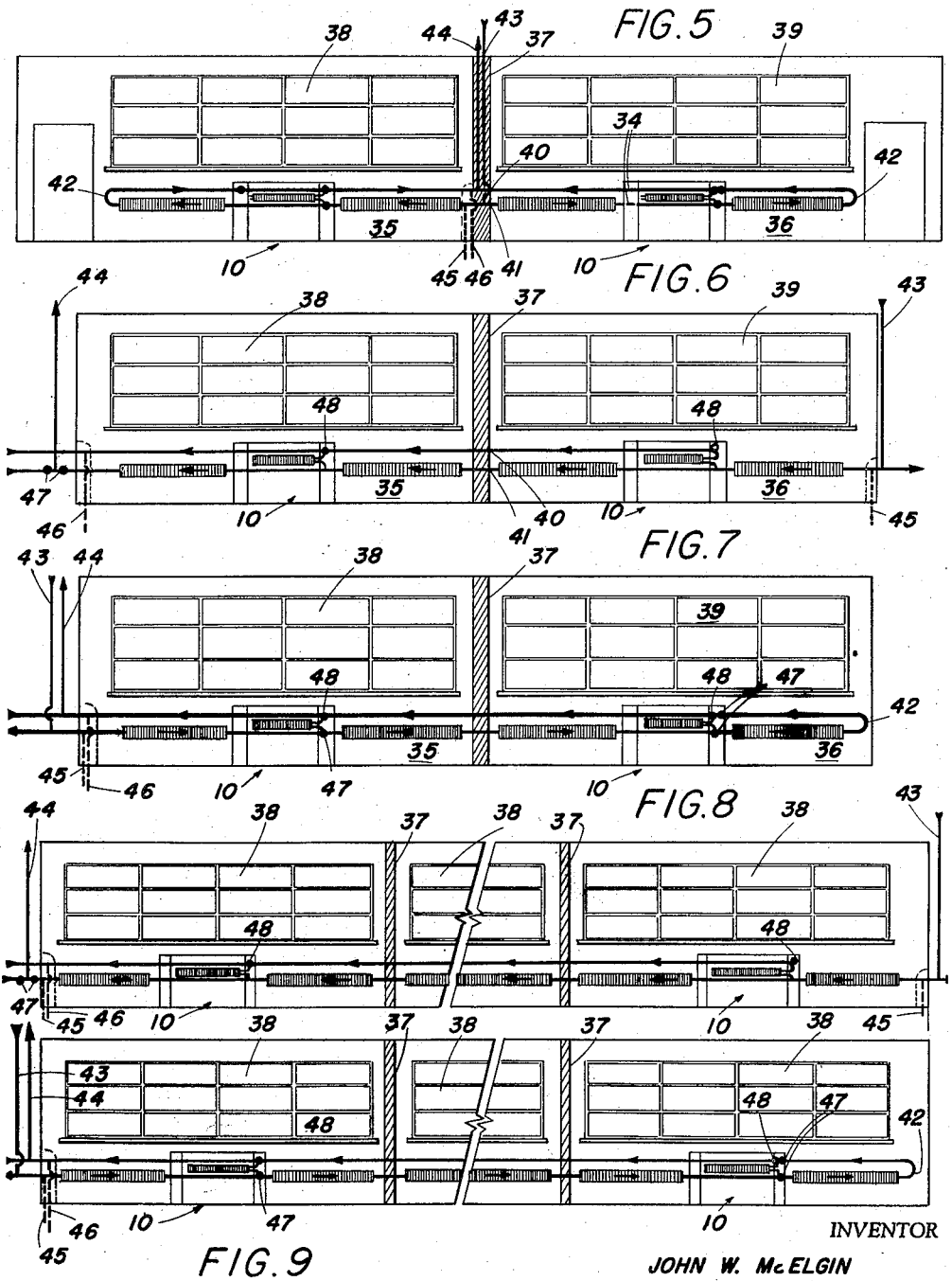
INVENTOR
JOHN W. McELGIN
SAMUEL W. MILLER, JR.
BY
ATTORNEYS

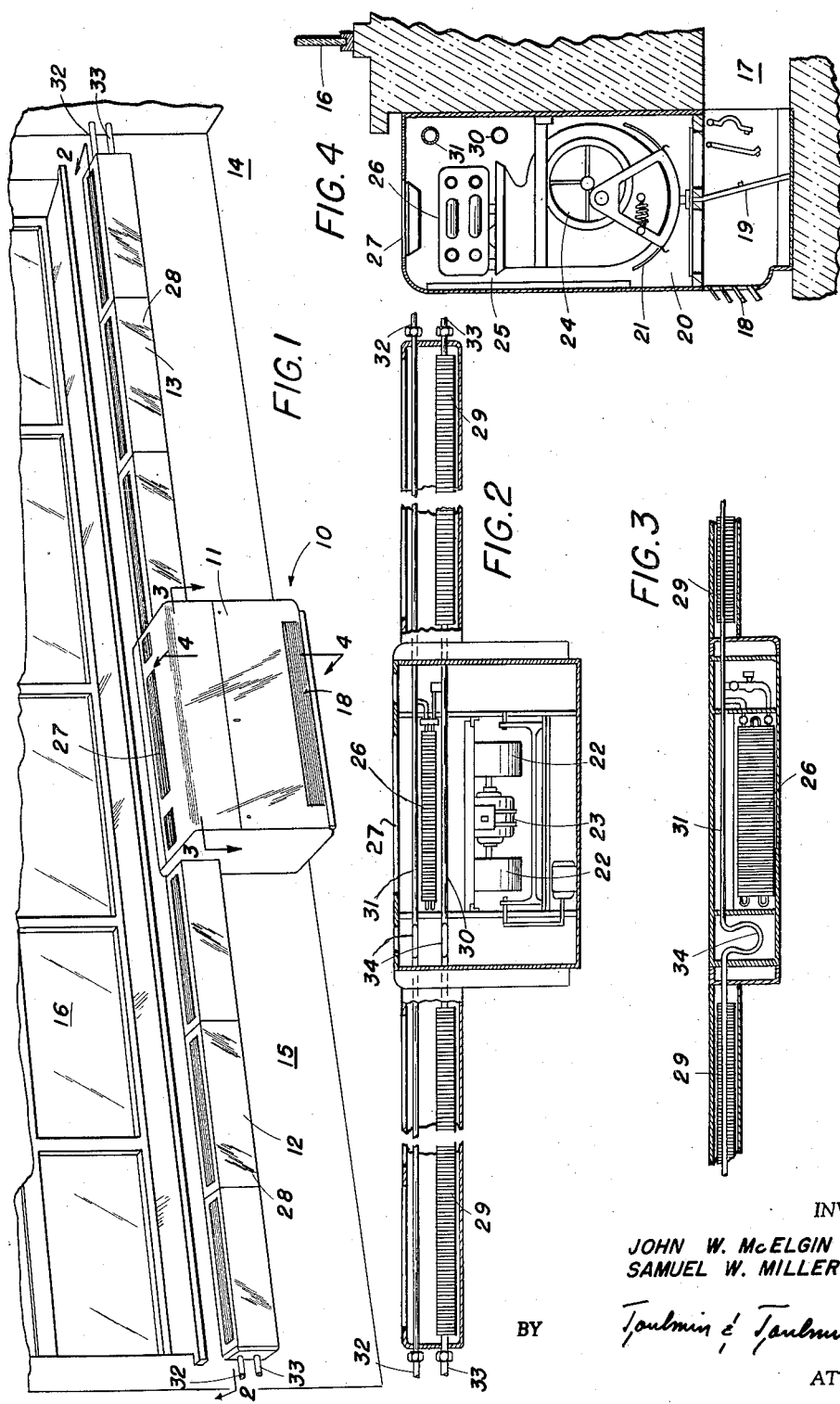

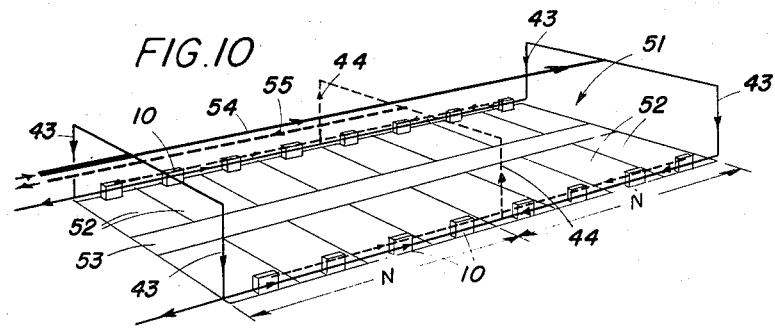
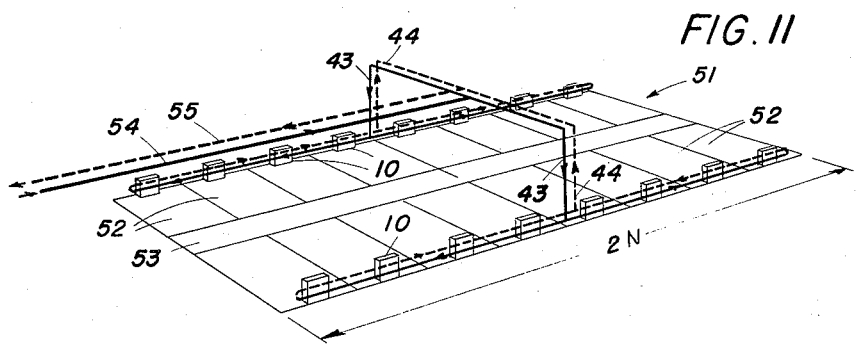
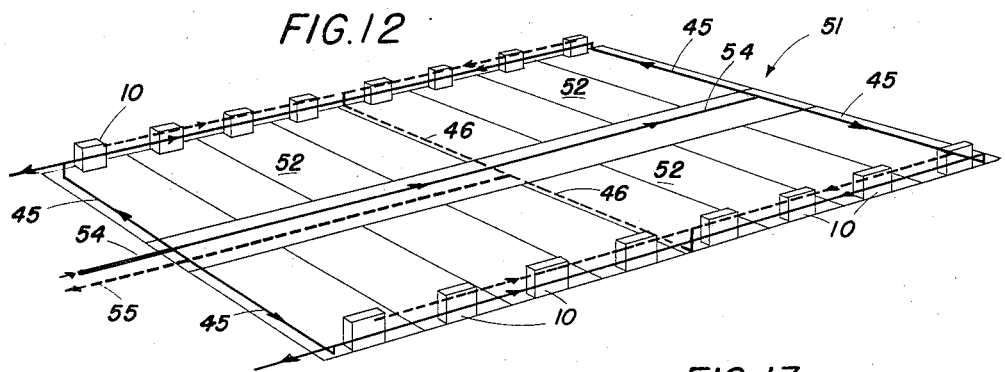
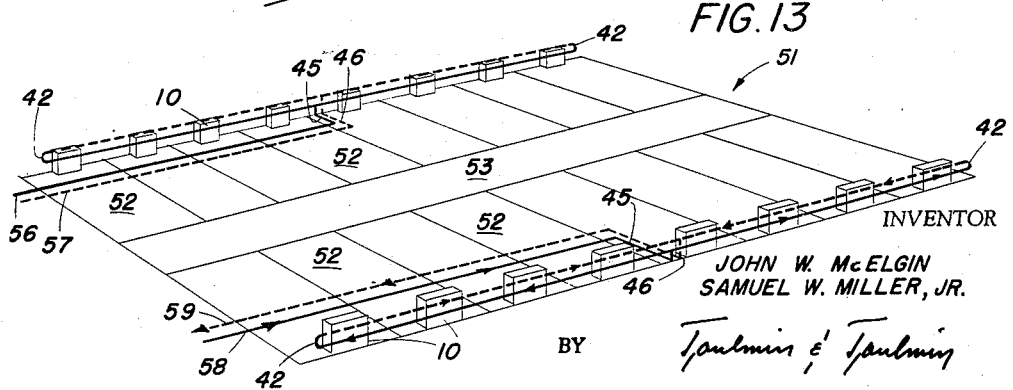

2,860,833

MULTI-ROOM HEATING AND VENTILATING SYSTEM

John W. McElgin and Samuel W. Miller, Jr., Holmesburg, Pa., assignors to John J. Nesbitt, Inc., Holmesburg, Pa., a corporation of Pennsylvania Application April 21, 1955, Serial No. 502,832

7 Claims. (Cl. 237—56)

The present invention relates to heating and air-conditioning, more particularly to multi-room arrangements of heating and ventilating units especially adapted for combatting window down drafts.

To date numerous heating and ventilating systems have been devised for multi-room applications. These multi-room applications are primarily for class-rooms wherein a considerable area of the outside wall of the room is occupied by a window. Other examples of multi-room applications are in offices, and in industrial plants where a large number of adjoining rooms have a common outside wall.

The conventional practice in the past has been to install a suitable heating and ventilating unit in each of the rooms. A separate set of supply and return means was then installed for each of the room units. This introduced complicated and expensive piping arrangements.

The usual process for establishing comfortable room conditions comprises admitting outside air to the units and heating the air to a predetermined comfortable temperature. However, in modern classrooms and the like having large window areas, occupant comfort cannot be achieved merely by maintaining the inner portion of the room at an optimum temperature. Means must be provided to combat the two effects created by the large window itself. These effects are window down draft and radiant loss by the occupants to the cold window surfaces.

The window down draft results from room air being chilled at the window, flowing downwardly along the window and then subsequently flowing out into the room in a continuous stream. Consequently, the room air-conditioning unit should combat the window down draft in addition to continually furnishing fresh comfortable air into the room.

There is presently a trend towards the use of forced hot water for heating and ventilating systems for schools and similar type applications. This trend is essentially based upon several advantages inherent in hot water systems. For example, the temperature of the water can be readily automatically varied with the outdoor temperature. This results in improved room temperature control than that which can be obtained using a constant temperature heating medium.

Another advantage is that the supply and return main piping is more flexible. The piping system is not bound by the condition of returning condensate to a boiler as is the case with steam.

Furthermore, the hot water piping for the same heat carrying capacity is considerably smaller than steam piping.

Utilizing the above characteristics of the forced hot water system, a wholly new approach to the heating of classrooms is possible.

The present invention discloses an air-conditioning system for installation in a single room together with various circuits into which these systems can be connected for multi-room installations.

The air-conditioning system of this invention essentially comprises a main heating and ventilating unit having auxiliary convector units extending laterally therefrom. The heating elements in the main and convector units are interconnected to enable hot water to flow through all or part of the convector and main units.

The convector units are positioned beneath the sills of the window. A sheet of warm air is directed upwardly from the convector units against the window. This sheet of heated air combats the window down draft by mixing with it, warming it, and diverting it upwardly over the occupants heads. The main heating and ventilating unit admits outside air and circulates this air throughout the room at an optimum temperature.

Since hot water can flow through the convector and main units this makes possible a grouping of multi-unit systems in entire wings of buildings into circuits wherein the air conditioning systems themselves contain the supply and return piping required. Consequently, the conventional mains extending to each of the room air-conditioning systems are eliminated.

Since each air-conditioning system comprises supply and return piping therein, these units provide complete flexibility in multi-room application. By taking full advantage of the adaptability and virtual lack of restriction on the placement of the piping inherent in the forced hot water system, these air-conditioning systems can be integrated into a series system which results in maximum protection against window down draft with a piping circuit which provides simplicity and economy of installation.

Therefore, the principal object of this invention is to provide an improved arrangement for multi-room applications of heating and ventilating units.

It is another object of this invention to provide multi-room installations for heating and ventilating units where the conventional mains to each unit are eliminated.

It is a further object of this invention to provide multi-room installations for heating and ventilating units wherein the units function as the supply and return lines.

It is an additional object of this invention to provide piping circuits for multi-room installations of heating and ventilating units which result in simplicity and economy of installation.

It is still another object of this invention to provide a forced hot water heating and ventilating unit containing supply and return piping therein.

It is a still further object of this invention to provide a multi-room forced hot water heating system characterized by extreme flexibility of arrangements into various circuits.

Other objects and advantages of this invention will become apparent upon reference to the accompanying description when taken in conjunction with the following drawings; wherein:

Figure 1 is an overall perspective view of the air-conditioning system of this invention;

Figure 2 is a sectional view taken along the lines 2—2 of Figure 1;

Figure 3 is a sectional view taken along the lines 3—3 of Figure 1;

Figure 4 is a sectional view taken along the lines 4—4 of Figure 1;

Figures 5 through 7 are schematic views illustrating circuit connections between air-conditioning systems for two class room applications;

Figures 8 and 9 are schematic views illustrating circuit connections between air-conditioning systems for multi-class room applications; and Figures 10 through 13 are schematic piping diagrams of circuit connections between air-conditioning systems for multi-classroom applications.

Proceeding now to the drawings, particularly to Figure 1, wherein like reference symbols indicate the same parts on the various views, 10 indicates generally a room air-conditioning system disclosed as this invention. The air-conditioning system 10 comprises a main heating and ventilating unit 11 and having convector units 12 and 13 extending laterally from each end of the main unit.

The system 10 is installed in a room 14 against an outside wall 15 having a window 16 therein. The window 16 occupies a considerable portion of the area of the outside wall 15. The air-conditioning system 10 is mounted beneath the window sill and extends the length of the window.

The main heating and ventilating unit 11 is illustrated in Figures 2 through 4, and comprises an outdoor inlet 17 and an indoor inlet 18, both of which are separated by a partition 19 to enable both inlets to communicate with a chamber 20. The degree of communication of each inlet with the chamber 20 is controlled by the setting of a roll damper 21 which can be positioned to close off either inlet completely. In its intermediate position the damper admits predetermined proportions of indoor and outdoor air into the chamber 20.

A pair of blowers 22 powered by a motor 23 located therebetween are positioned within the chamber 20. The chamber 20 communicates with the blowers 22 through inlets 24. The blowers discharge the air upwardly into a chamber 25 in which is located a main heating element 26. The heating elements 26 are of the multi-pass type and comprise finned tubing.

After the air passes through the heating element 26, it is discharged outwardly into the room through a discharge opening 27 located in the top of the unit.

The convector units 12 and 13 each comprises a casing 28 having top and bottom openings therein. There is a heating element 29 in each of the convector units. The convector heating elements are of the single pass type and comprise copper tubing having a plurality of heating fins thereon.

The convector heating elements 29 are connected serially by means of a conduit 30. Located above the conduit 30 and passing through both convector units and the main unit is a return line 31. The return line has connections 32 extending beyond the outer ends of each of the convector units. Similarly the convector heating elements have supply connections 33 also extending beyond the outer ends of the convector units.

The main unit heating element 26 is connected across the conduit 30 and the return line 31.

There are expansion loops 34 in both the supply and return lines 30 and 31. These expansion loops are located in the left hand piping compartment of the main unit 11. The loops permit expansion of the convector heating elements when the air-conditioning system is employed in multi-room applications.

With the above described structure of the air-conditioning system in mind, the various applications of this air-conditioning system in multi-room installations will be presently described. The various circuits into which the air-conditioning systems may be connected for both two-room and multi-room applications will be indicated. In addition, schematic piping diagrams of the several multi-room applications will also be described in order to illustrate the simplicity of the piping arrangement.

In each application a suitable temperature regulation system is provided to progressively increase the hot water temperature as the outside temperature falls. This will greatly increase the protection against the effects of window down draft and the cold surface directly to their intensity.

In Figure 5 there is illustrated a two-room application of the air-conditioning system of this invention. Rooms indicated at 35 and 36 are divided by a partition 37. There are windows 38 and 39 in each of the rooms. The air-conditioning system 10 is installed in each one of the rooms 35 and 36 beneath the respective windows. There are connections 40 and 41 between the return and supply lines of each of the systems. These connections 40 and 41 pass through the partition 37. The outer ends of supply and return lines of each of the air-conditioning systems are connected, as indicated at 42.

This application is suitable for use in either up-feed or down-feed systems. Since the two units are in parallel either a direct or reverse return may be employed. The terms "up-feed" and "down-feed" refer to the locations of the mains with respect to the units being serviced.

In the direct return system, both the supply and return piping follow the shortest route from the boiler and pump to the air-conditioning system being served. Because of the differences in head loss to the pumping, the available head at the system nearest the pump is higher than that at the farthest unit. Because of the difference in pressure available at each system, manually adjusted balancing valves are employed to equalize the flow rates.

In the reverse return system, the supply line takes the most direct route from the boiler and pump to the systems being served, but the return line is run parallel with the supply line to the most remote unit and then back to the pump and boiler. The reverse return systems provide a balanced piping system. Consequently, there is no need to equalize head losses in the piping. The piping in this system, however, is generally more complex than in a direct return system.

Down-feed supply and return run-outs 43 and 44 are concealed in the partition 37. Up-feed supply and return run-outs indicated at 45 and 46 may be extended upwardly also through the wall partition 37, or in a piping compartment located in the corner of one of the rooms.

If up-feed run-outs are employed, air vents must be provided for at each system serviced. As the mains are located below the system being served, air may be trapped in each unit. The vents accordingly will release the trapped air.

Expansion loops 34 are provided in the supply and return lines of one of the air-conditioning systems 10.

If the systems are connected for a direct return piping arrangement, balancing valves indicated at 47 must be provided to regulate the flow of hot water between the convector heating elements and the main heating elements.

In Figure 6 there is illustrated a reverse return system wherein a series of air-conditioning systems serve two rooms by means of alternate supply and return run-outs located in the partition walls of every second class room. This arrangement is also suitable for use on either the up-feed or down-feed systems.

It is pointed out that while the supply run-out is connected to the air-conditioning supply connection 33, the return run-out is connected to both the return and supply lines at the connections 32 and 33. Balancing valves 47 are provided in the lower supply conduit on both sides of the return run-out connection thereto.

If desired, up-feed run-outs indicated at 45 and 46 may be employed. As indicated previously, if up-feed run-outs are used air vents 48 for each of the air-conditioning services must be installed.

The convector unit heating element between the last main heating and ventilating unit and the return connection is connected in parallel with the heating elements of the main unit. A balancing valve 47 is employed to regulate the amount of water passing through this convector unit.

Connections 49 and 50 are provided to connect the return and supply lines to adjacent similar systems.

Figure 7 illustrates a series connection between a plurality of air-conditioning systems 10 for use on up-feed or down-feed direct return systems. The hot water is supplied through supply and return run-outs located in the partition walls in every fourth room. Similarly, up-feed run-outs may be provided in the same partition or on a piping compartment located in the room.

In this arrangement the outer ends of supply and return lines of the extreme air-conditioning system 10 are connected, as indicated at 42. The convector heating element at the extreme end of the circuit farthest from the run-outs is connected across the heating elements of the main heating and ventilating units. A balancing valve 47 is employed to regulate the flow of water passing through this convector heating element.

Figure 8 shows a plurality of air-conditioning systems connected in series for either an up-feed or down-feed system employing a reverse return. This circuit is similar to the circuit described in Figure 6, but is shown as installed for a number of rooms greater than two.

It is pointed out that in this application a single run-out, either supply or return, serves two groups of rooms, one located at either side of the partition in which the run-out is located. Connections are provided to connect the circuit illustrated with similar adjacent circuits.

In Figure 9 there is illustrated a plurality of air-conditioning systems connected in series for use with up-feed or down-feed systems employing a direct return. This circuit is similar to the circuit illustrated in Figure 7 but illustrates the application of air-conditioning systems to a number of rooms greater than two.

It is pointed out that in this application one set of run-outs will serve two groups of class rooms, one located on either side of the partition in which the run-outs are carried.

Figure 10 illustrates a schematic piping diagram for the down-feed reverse return system illustrated in Figure 9.

In this application heating and ventilating systems are installed in the wing of a building indicated at 51. The wing 51 comprises a plurality of rooms 52 which are arranged in parallel rows and each row having an outer wall.

The number of rooms which can be served by connecting the air conditioning systems of this invention in series is dependent upon several factors. These factors are as follows:

(1) The heat medium carrying capacity of the system;
(2) The required heating capacity of the system;
(3) The desired water temperature drop.

For example, by employing a 1¼" tube size in the heating elements, a desired temperature water drop of 50°, and a heat loss per room (including the vent load) of 40,000 B. t. u. per hour as many as nine rooms may be heated on a single series circuit. The number of rooms is indicated as N, as shown in Figure 10.

There is a corridor 53 separating the rows of rooms. Supply and return mains 54 and 55 are located in the corridor ceiling. The various supply and return run-outs as described in connection with Figure 8 lead from the respective mains through the ceiling and pass downwardly within the wall to connect with the respective supply and return lines.

Figure 11 shows a schematic piping diagram for a down-feed direct return system illustrated in Figure 9. With this arrangement, the supply and return lines are similarly positioned in the corridor ceiling. The supply and return down-feed run-outs extend together through the ceiling down through the wall and connect to the respective supply and return lines between the central two adjacent air-conditioning systems. In this arrangement a single set of run-outs will supply 2N class rooms.

In Figure 12 there is illustrated a schematic piping diagram of an up-feed reverse return system as illustrated in Figure 8. In this arrangement the supply and return mains 54 and 55 are located in the floor beneath the corridor. The return and supply run-outs extend transversely from the supply and return mains beneath the floor to the outside wall of the building wing and then extend upwardly to connect respectively the supply and return lines of the series air-conditioning systems.

In Figure 13 there is illustrated a schematic piping diagram for an up-feed direct return system as illustrated in Figure 9. In this arrangement two groups of class rooms, combined on direct return series air-conditioning systems, are supplied and returned in parallel by up-feed run-outs located at the common partition wall.

Supply and return mains 56 and 57 extend beneath the floor of the building to connect with the up-feed run-outs between the center two adjacent systems in one row of rooms. A second set of supply and return mains 58 and 59 are provided to connect to the up-feed run-outs leading to the air-conditioning systems in the other row of rooms.

Thus it can be seen that with the air-conditioning system of this invention and the various described series of connections of these air-conditioning systems, a great variety of arrangements may be achieved with extreme economy in piping. This economy of piping is attainable by means of employing air-conditioning systems having supply and return run-outs therein. As pointed out with the various multi-room applications the need for conventional mains to the various air-conditioning systems is eliminated. A group of air-conditioning systems are connected in series and it is only necessary to connect this series of air-conditioning systems with a greatly decreased number of run-outs.

Since many piping connections are eliminated at the site of installation, the time and cost of installing a heating and ventilating system as described in this invention is greatly reduced. In addition, these series of air-conditioning systems combine all the enumerated advantages of forced hot water systems together with the advantages derived from employing these air-conditioning systems as supply and return run-outs.

It will be understood that this invention is susceptible to modification in order to adapt it to different usages and conditions, and, accordingly, it is desired to comprehend such modification within this invention as may fall within the scope of the appended claims.

What is claimed is:

1. In a multi-room air-conditioning arrangement, an air-conditioning system in each room with each said system comprising a main heating and ventilating unit enclosed by a housing with elongated casings extending laterally from each end of said main unit housing to form convector units with said main unit and convector units forming a complete room system adapted for mounting against a wall of a room, there being a heat exchange element in each of said main and convector units, means extending through the main unit housing and convector unit casings of each air-conditioning system for supplying a heating medium to the heat exchange elements of each air-conditioning system, means extending through the main unit housings and convector unit casings of each air-conditioning system for returning the heating medium through each individual system of the air-conditioning arrangement, and means for serially connecting the supply and return means of the air-conditioning systems to provide a continuous flow path for the heating medium through the connected air-conditioning systems so as to eliminate the conventional mains and risers thereto to each individual air-conditioning system.

2. In a multi-room air-conditioning arrangement, an air-conditioning system in each room with each said system comprising a main heating and ventilating unit enclosed by a housing with elongated casings extending laterally from each end of said main unit housing to form convector units with said main unit and convector units forming a complete room system adapted for mounting against a wall of a room, there being a heat exchange element in each of said main and convector units, means extending through the main unit housing and convector unit casings of each air-conditioning system and projecting from the extreme ends of the convector unit casings for supplying a heating medium to the heat exchange elements of each air-conditioning system, means extending through the main unit housing and convector unit casings of each air-conditioning system and projecting from the extreme ends of the convector unit casings for returning the heating medium through each individual system of the air-conditioning arrangement, and means for serially connecting the supply and return means of the air-conditioning systems to provide a continuous flow path for the heating medium through the connected air-conditioning systems so as to eliminate the conventional mains and risers thereto to each individual air-conditioning system.

3. In a multi-room air-conditioning arrangement, an air-conditioning system in each room with each said system comprising a main heating and ventilating unit enclosed by a housing with elongated casings extending laterally from each end of said main unit housing to form convector units with said main unit and convector units forming a complete room system adapted for mounting against a wall of a room, there being a heat exchange element in each of said main and convector units, a supply line and a return line extending through the main unit housing and convector unit casings and projecting from the extreme ends of the convector casings, heat exchange means on the portions of the supply line within the convector casings so as to form heat exchange elements in said convector units, a heat exchange element in said main unit housing connected across said supply and return lines, and means for serially connecting the supply and return lines projecting from the ends of the convector casings to provide a continuous flow path for the heating medium to the connected air-conditioning system so as to eliminate the conventional mains and risers to each individual air-conditioning system.

4. In a multi-room air-conditioning arrangement, an air-conditioning system in each room with each said system comprising a main heating and ventilating unit enclosed by a housing with elongated casings extending laterally from each end of said main unit housing to form convector units with said main unit and convector units forming a complete room system adapted for mounting against a wall of a room, there being a heat exchange element in each of said main and convector units, a supply line and a return line extending through the main unit housing and convector unit casings and projecting from the extreme ends of the convector casings, heat exchange means on the portions of the supply line within the convector casings so as to form heat exchange elements in said convector units, a heat exchange element in said main unit housing connected across said supply and return lines, means serially connecting the ends of the supply line and the return line projecting from the extreme ends of the extreme ones of the plurality of air-conditioning systems, a feed run-out connected to the supply line connection between the two central adjacent systems, and a return run-out connected to the return line connection between the same adjacent systems.

5. In a multi-room air-conditioning arrangement, an air-conditioning system in each room with each said system comprising a main heating and ventilating unit enclosed by a housing with an elongated casing extending laterally from each end of said main unit housing to form a convector unit with said main unit and convector units forming a complete room system adapted for mounting against a wall of a room, a supply line and a return line extending through the main unit housing and convector unit casings and projecting from the extreme ends of the convector casings, a heat exchange element in each main unit housing and convector unit casing with said heat exchange elements being connected across said supply and return lines, means for respectively connecting the supply and return lines of adjacent systems, means connecting the supply and return lines to each other in each of the extreme systems of the arrangement, a supply conduit connected to the outer end of one of the extreme systems to convey a heating medium through the plurality of systems, and a return conduit connected to both the supply and return lines at the outer end of the other extreme system for withdrawing the heating medium from the plurality of systems.

6. In a multi-room air-conditioning arrangement for parallel rows of adjoining rooms, an air-conditioning system in each room with each said system comprising a main heating and ventilating unit enclosed by a housing with elongated casings extending laterally from each end of said main unit housing to form convector units with said main unit and convector units forming a complete room air-conditioning system adapted for mounting against the outside wall of a room, a supply line and a return line extending through the main unit housing and convector unit casings and projecting from the extreme ends of the convector unit casings, there being connections on each supply line and return line adjacent the outer ends of the convector casings of each system, a heat exchange element in the main unit housing and the convector unit casings connected across the supply and return lines, means for respectively connecting the supply and return connections from adjacent systems, supply and return mains positioned between said rows of air-conditioning systems, supply run-outs leading from said supply main to the outer supply connections of the extreme ones of said plurality of systems, and a return run-out leading to said return main from the means connecting the supply and return connections between the same adjacent systems.

7. In a multi-room air-conditioning arrangement for parallel rows of adjoining rooms, an air-conditioning system in each room with each said system comprising a main heating and ventilating unit enclosed by a housing with elongated casings extending laterally from each end of said main unit housing to form convector units with said main unit and convector units forming a complete room air-conditioning system adapted for mounting against the outside wall of a room, a supply line and a return line extending through the main unit housing and convector unit casings and projecting from the extreme ends of the convector unit casings, there being connections on each supply line and return line adjacent the outer ends of the convector casings of each system, a heat exchange element in the main unit housing and the convector unit casings connected across the supply and return lines, means for respectively connecting the supply and return connections from adjacent systems, means connecting the outer ends of the extreme supply and return connections of each row of systems, supply and return mains between the rows of air-conditioning systems, a feed run-out from said supply main to the supply connection between the central adjacent systems in each row, and a return run-out to said return main from the return connections between the same adjacent systems.

References Cited in the file of this patent

UNITED STATES PATENTS

| | | |
|---|---|---|
| 528,928 | Dixon | Nov. 13, 1894 |
| 761,581 | Cluthe | May 31, 1904 |
| 860,700 | Simonds | July 23, 1907 |
| 1,606,108 | Sklar | Nov. 9, 1926 |
| 1,886,292 | Modine | Nov. 1, 1932 |
| 1,922,220 | Sprague | Aug. 15, 1933 |
| 1,969,315 | Moller | Aug. 7, 1934 |

(Other references on following page)

UNITED STATES PATENTS

| 2,246,802 | Kehm et al. | June 24, 1941 |
| 2,264,122 | Scharff | Nov. 25, 1941 |
| 2,376,412 | Arthur | May 22, 1945 |

FOREIGN PATENTS

| 403,241 | France | Oct. 28, 1909 |

OTHER REFERENCES

"Trane-Bulletin DS-355," March 1949, published by Trane Company, LaCrosse, Wisconsin, pages 20-21 relied on.

"Heating, Ventilating, Air Conditioning Guide" (1945 edition, published ASHVE). (Figures on pp. 287, 303 relied on.)